July 29, 1941.  C. J. VAN BUREN  2,250,510
AUTOMOBILE INSULATION
Filed Sept. 21, 1939   2 Sheets-Sheet 1
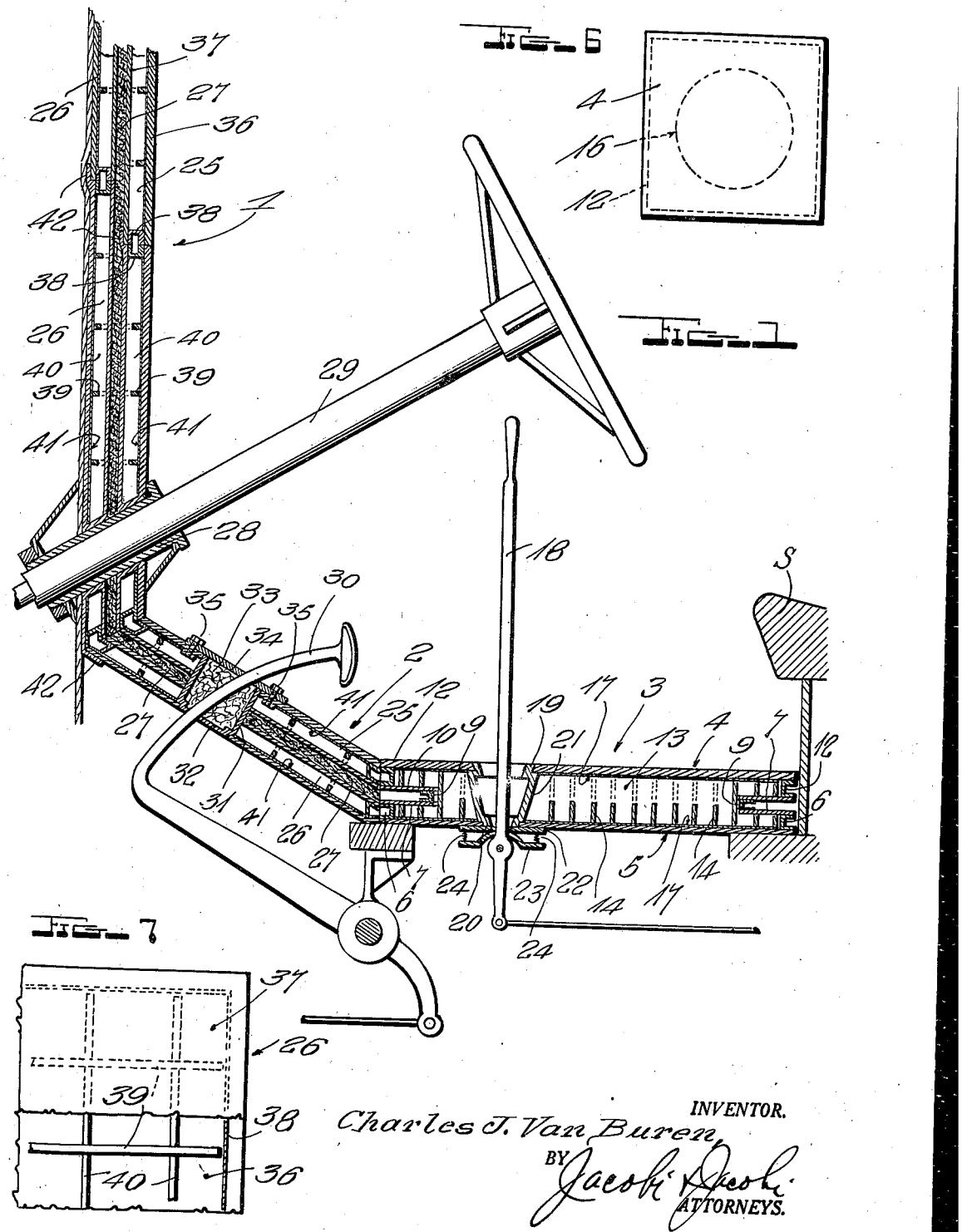
INVENTOR.
Charles J. Van Buren
BY
ATTORNEYS.

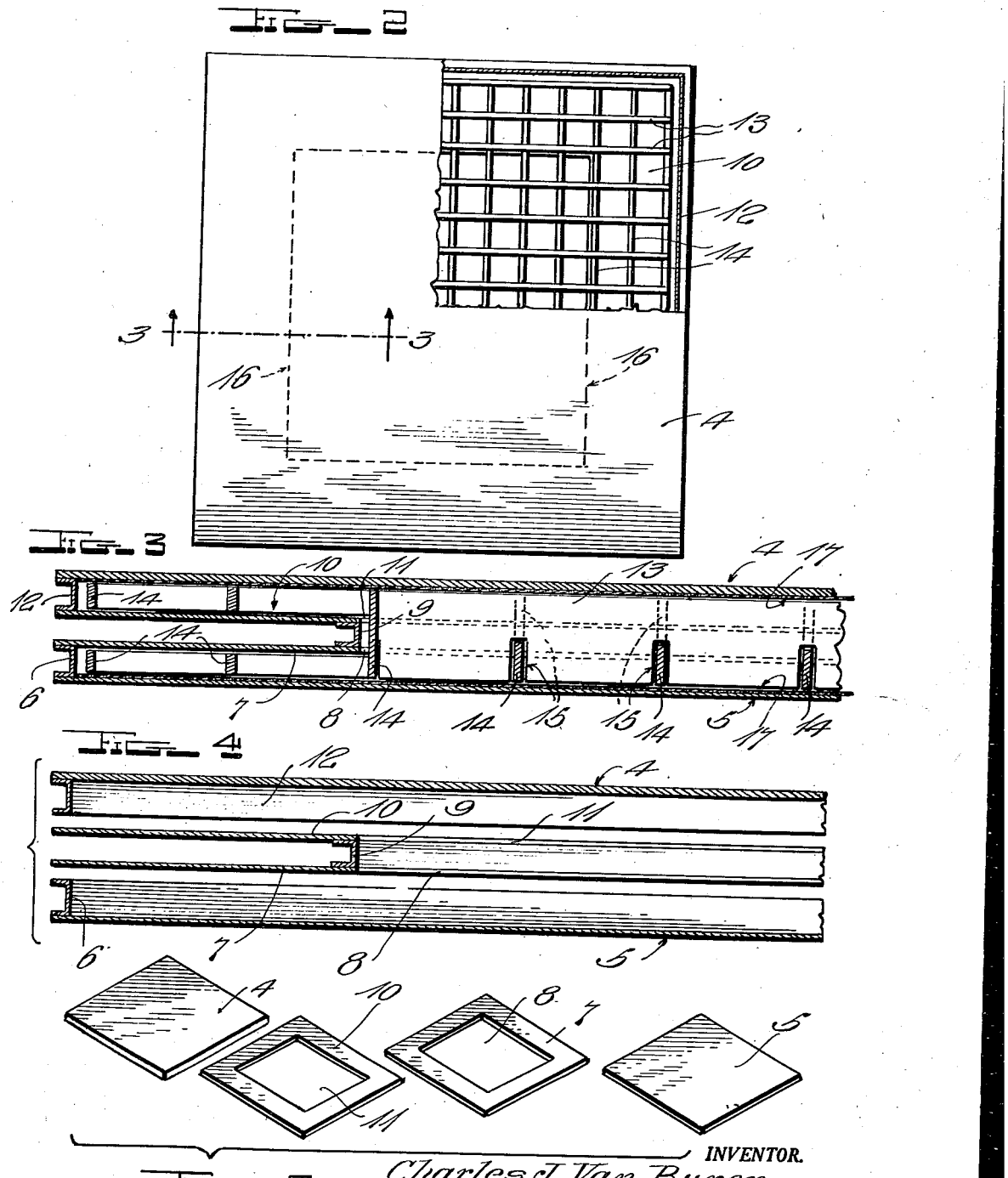

Patented July 29, 1941

2,250,510

UNITED STATES PATENT OFFICE 2,250,510

AUTOMOBILE INSULATION

Charles J. Van Buren, Fort Lauderdale, Fla.

Application September 21, 1939, Serial No. 295,965

4 Claims. (Cl. 296—28)

This invention relates to motor vehicles and more particularly to the flooring and dashboard thereof, it being one object of the invention to provide the automobile body with a flooring and dashboard so insulated that passage of heat and sound through the same will be prevented. The flooring and the dashboard are formed of hollow panels which are evacuated to provide vacuum insulation which has been found to serve very effectively to prevent passage of heat and sound and the panels formed in accordance with this invention constitute an improvement over those shown and described in my copending application for Automobile insulation, Serial No. 254,292, filed February 2, 1939.

When an automobile is in operation, heat emitted from the engine and the muffler and also heat from a hot road or paved street has a tendency to enter the body of an automobile or other motor vehicle through the flooring and the dashboard and it is, therefore, one object of the invention to provide the automobile body with flooring and a dashboard so insulated that passage of heat through the same will be very effectively prevented, this being accomplished through the medium of an improved construction wherein the flooring and the dashboard are of hollow formation and air is evacuated therefrom to form a vacuum within the panels from which the flooring and the dashboard are formed.

Another object of the invention is to provide an automobile body wherein the flooring consists of a single panel or a number of companion panels, each of which is so formed that when the outer wall thereof becomes hot, the heat will be prevented from reaching the inner wall of the panel, this being due to the manner in which marginal portions of the panel are formed.

Another object of the invention is to provide a panel which may be formed of thin sheet metal, the walls of the panel being very effectively braced by spacers mounted within the hollow panel and serving to prevent the thin sheet metal from which the walls are formed from being distorted and bent out of shape or cracked by action of the vacuum within the panel or by the weight of a person within the vehicle.

It is another object of the invention to provide an improved evacuated panel wherein the spacers which reinforce the walls thereof are formed of non-heat conductive material, thus preventing heat of the outer wall from passing through the spacers to the inner wall and causing the heat to so pass from the outer wall toward the inner wall that it will be dissipated before reaching the inner wall.

Another object of the invention is to provide a panel wherein reinforcing sheets of asbestos or the like are disposed between the spacers and the inner and outer walls of the panels, thus preventing the edges of the strips constituting the spacers from having direct contact with the inner and outer walls and thus preventing these strips from cutting the sheet metal from which the inner and outer walls are formed.

Another object of the invention is to provide an automobile body wherein the dashboard and the foot-board or forward portion of the flooring consists of inner and outer evacuated panels spaced from each other by a packing of insulating material, the evacuated panels and the packing serving very effectively to exclude from the interior of the automobile, truck or bus, the heat and fumes from the engine.

Another object of the invention is to so form the panels constituting the inner and outer walls of the dashboard and the foot-board that cracks between abutting panels will be closed by overlapping portions of the panels, thus tightly closing the joints between the abutting panels and preventing warm air from reaching the interior of the automobile body through the cracks.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawings, wherein—

Figure 1 is a sectional view taken vertically through the forward portion of an automobile body having its flooring and dashboard insulated in accordance with the invention.

Figure 2 is a view showing a flooring panel of the improved construction in top plan, a portion of the upper wall thereof being broken away in order to show the spacers within the panels.

Figure 3 is a vertical sectional view upon an enlarged scale taken along the line 3—3 of Fig. 2.

Figure 4 is a group view showing elements forming the panel in vertical section with the spacers omitted.

Figure 5 is a group view showing in perspective the sheet metal members from which the walls of the panel are formed.

Figure 6 is a top plan view of a slightly modified form of panel.

Figure 7 is a fragmentary view showing a corner portion of one of the dashboard panels partially in plan and partially in section.

In Figure 1 of the drawings, there has been shown the forward portion of an automobile body which includes a dashboard 1, a foot-board 2, and flooring 3. While the flooring has been shown terminating at the front seat S, it will be understood that the improved flooring will extend the full length of the automobile body in order to prevent heat, engine fumes and noise from entering the rear portion thereof as well as excluding heat, fumes and noise from the forward portion of the automobile. The flooring will now be described and while it will be described as consisting of a single panel, it will be understood that it may be formed of a number of companion panels having abutting edge-to-edge engagement with each other.

The improved floor panel is illustrated in detail in Figures 2 through 5, inclusive. Referring to these figures, it will be seen that the panel has an upper or inner wall 4 formed of relatively thin but strong sheet metal and a lower or outer wall 5 which is also formed of thin but strong sheet metal and of dimensions corresponding to the upper wall. The outer wall 5 will preferably be formed of 30 gage sheet metal and the inner wall 4 of 24 gage sheet metal. A frame 6 formed of channeled metal and of the same dimension as the wall 5, constitutes a lower edge wall member and rests upon the lower plate or wall 5 with its lower flange welded to marginal portions of the lower wall. The upper flange of the lower edge wall member or frame 6 is similarly welded to marginal portions of a metal plate 7 which is of the same dimensions as walls 4 and 5 and formed with a central cutout or opening 8. A frame 9 which is also formed of thin but strong sheet metal and of channeled formation rests upon the upper surface of the plate 7 with its lower flange welded thereto along margins of the opening 8 and the upper flange of the frame 9 is welded to a plate 10 along margins of the opening 11 formed centrally therein in alinement with the center opening 8 of plate 7. The plate 10 is of the same size and configuration as the plate 7 and has its outer marginal portions welded to the lower flange of a frame 12 corresponding to the frame 6 and having its upper flange welded to marginal portions of the upper wall 4. When the metal sheets forming the upper and lower walls 4 and 5 and the plates 7 and 10 formed with the openings or cutouts 8 and 11 are all welded to the frames 6, 9 and 12, a hollow tile or slab or enclosure will be formed from which air may then be exhausted to form a vacuum within the tile. The walls of the tile must be reinforced in order to prevent collapsing of the tile due to action of the vacuum or by the weight of a person standing thereon or occupying a seat in the automobile body with his feet resting upon the tile. In order to do so, there have been provided spacers 13 and 14 which are mounted within the hollow tile as shown clearly in Figure 2 with the spacing strips 13 and 14 extending transversely of each other. These strips may be formed of plywood or other suitable non-heat conductive material and each of the strips is formed with recesses 15 spaced from each other longitudinally thereof. These recesses are so located that the strips 14 and 15 have interfitting engagement with each other as shown in Figure 3, thus disposing upper and lower edges of the spacers flush with each other and also causing the strips to hold each other in their proper position. Intermediate portions of the spacer strips are of sufficient depth to extend the full depth of the tile through the well 16 defined by the openings 8 and 11 and the frame 9, and end portions of the spacer strips are of such depth that they will fit between the upper and lower walls of the tile and the plates 7 and 10. If so desired, the portions of the spacer strips disposed between the upper and lower walls of the tile and the plates 7 and 10 may be formed separately from the portions of the strips extending through the well 16. By forming the spacer strips of plywood or other suitable non-heat conductive material, they will be prevented from acting as heat conductors between the upper and lower walls of the tile. In view of the fact that the upper and lower walls of the tile are formed of thin sheet metal, the upper and lower edges of the spacers would have a tendency to cut into these walls or cause the walls to be bent along edges of the spacers by action of the vacuum within the tile or the weight of a person standing upon the tile, or resting his feet thereon while occupying a seat within the automobile body. In order to prevent this, there have been provided asbestos sheets 17 which are interposed between the upper and lower walls 4 and 5 and the edges of the spacer strips. It will thus be seen that the edges of the spacer strips will be prevented from having direct contact with the sheet metal walls. By forming the wall 4 thicker than the wall 5, additional strength will be imparted thereto and likelihood of this wall being bent or punctured by a nail in a person's heel reduced to a minimum. It should also be noted that instead of forming the openings 8 and 11 of square outline as shown in Figures 2 and 5, they may be circular as shown in Figure 6, oval or any other desired shape. After the members forming the hollow tile are welded to each other, the entire tile is dipped in a tinning bath, thus forming a coating which will seal pores of the metal and not only eliminate porosity but also prevent corrosion. As porosity is eliminated, a high vacuum may be formed and maintained in the hollow tile.

In order to form a flooring, a suitable number of flooring slabs are set in place with their edges in abutting engagement with each other and the air tight joints formed between abutting edges of the slabs by sealing the cracks in a desired manner. When the slab is designed for a special type of automobile body, it may be of the proper dimensions and configuration permitting use of a single slab for the entire flooring or for the portion of the flooring between the front seat 4 and the foot-board 2. The lever 18 must be permitted to extend through the flooring and in order to do so, the slab through which this lever extends has its inner and outer wall formed with alined openings to snugly receive the necks 19 and 20 at upper and lower ends of a sleeve 21. This sleeve extends vertically through the tile and its upper and lower necks are welded to the upper and lower walls thereof to form an air tight joint. Plates 22 and 23 fit about the lever with the plate 22 bearing against the underface of the tile and between these plates are disposed springs 24 which cause a tight fit and prevent passage of air through the sleeve. It will thus be seen that the lever 18 may be actuated in the usual manner without air being allowed to enter the interior of the automobile body through the sleeve. The outer wall or lower wall 5 of the panel will be heated to quite a high temperature by heat from the muffler or by heat radiated from a hot road or paved street. The heat from the hot wall 5 passes upwardly therefrom through the frame 6 to the wall 7 and while a portion of this heat may reach the frame 9 none of the heat will reach the upper or inner wall 4 as in order to do so, it must pass through the wall 10 to the outer edges thereof and upwardly through the frame 12 to the wall 4. The fact that the heat must follow a tortuous path between the lower wall 5 and the upper wall 4 causes the heat to be entirely dissipated before it can reach edges of the upper wall and the upper wall will at all times be cool even if the lower or outer wall is quite hot. Passage of heat into the interior of the automobile through the flooring will thus be prevented. The absence of air within the panel and the fact that the spacer strips are formed of plyboard or other non-heat conductive material very effectively prevents transmission of heat from the lower wall to the upper wall except by way of the walls 7 and 10 and the frames 6, 9 and 12 and as previously explained, the distance the heat must travel from the lower wall in order to reach the upper or inner wall prevents the upper wall from becoming hot.

The dashboard 1 and the foot-board 2 each consists of a suitable number of inner panels 25 having edge-to-edge engagement with each other and a suitable number of outer panels 26 having edge-to-edge engagement with each other. The panels 25 and 26 are separately attached to the vehicle with the inner panels 25 mounted in spaced relation to the outer panels to provide space between the panels which is filled with insulating material 27. The insulating material may be rock wool, cork, asbestos or any other suitable insulating material. The panels 25 and 26 may extend the full width of the dashboard and the foot-board or they may be of less width than the dashboard and the foot-board and a suitable number used. A sleeve 28 extends through the panels forming the dashboard to accommodate the steering column 29 and the panels of the foot-board through which the brake pedal 30 passes carry a sleeve 31 having its reduced lower end 32 fitting snugly in an opening formed in the lower or outer wall of the panel 26 to which it is welded in order to form an air-tight joint. This wall or sleeve is filled with rock wool or other suitable packing serving as an insulating medium as shown at 33 and the upper end of sleeve is closed by a plate 34 having its marginal portions projecting therefrom and secured very firmly in face-to-face engagement with the upper wall of the panel 25 by a stud and nut 35. By removing this plate, additional packing may be placed within the sleeve or well when necessary. The panels 25 and 26 are of substantially a duplicate construction but it should be noted that the panels 25 forming the dashboard are of such dimension that when the dashboard is erected the joints between the abutting edges of the panels 25 will be in offset or staggered relation to the joints between abutting side edges of the panels 25. This will aid in preventing air from seeping through the dashboard.

Each of the panels 25 and 26 is of hollow construction and has an outer wall 36, an inner wall 37 and a marginal wall 38. The inner and outer walls are formed of sheet metal plates and the marginal wall consists of a frame which is also sheet metal but of a channel formation. This frame or marginal wall extends entirely about the periphery of the tile and has its flanges welded to marginal portions of the inner and outer walls to form an air-tight seal. Strips 39 and 40 constituting spacers extend in crossed relation to each other within the hollow tile to reinforce the inner and outer walls and prevent them from collapsing when a vacuum is formed in the tile by exhausting air therefrom. These strips are recessed at their intersections so that they interlock and maintain each other in their proper positions. There have also been provided sheets of asbestos 41 between the walls and edges of the spacers to prevent the spacers from cutting into the sheet metal from which the walls are formed. It is desired to form a tight joint between abutting edges of the panels. In order to do so, marginal portions of the outer walls are extended as shown at 42 to provide lips which overlap marginal edge portions of adjoining panels and have flat contacting engagement therewith. These lips serve very effectively to cover the cracks between the abutting edges of the panels and since they have very close contacting engagement therewith, air will be prevented from passing through the cracks. By forming the foot-board and the dashboard of hollow inner and outer panels having air evacuated therefrom and packing space between the inner and outer panels with rock wool or equivalent material, which is a non-conductive of heat, passage of heat from the hot engine located a short distance forwardly from the dashboard and the foot-board will be very effectively prevented. The manner in which the dashboard and the foot-board and flooring are formed also serves to exclude sound which is often very annoying to persons riding in the motor vehicle.

In order to prevent injury to the slabs, I prefer to apply an insulating or protecting material thereto at the joints or at any place where such slabs overlap or abut, such material being resin or any other desired material which will serve the purpose.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

What is claimed is:

1. A motor vehicle body including a dashboard and flooring formed of panels, one of said panels comprising a hollow shell having solid inner and outer walls, intermediate wall members between the inner and outer walls spaced therefrom and from each other and having their central portions open, and closure members extending between margins of the walls and the intermediate wall members and together with the intermediate wall members forming a channel of appreciable width extending entirely about the panel.

2. A motor vehicle body including a dashboard and flooring formed of panels, one of said panels comprising a hollow shell having inner and outer walls of sheet material, plates between the inner and outer walls having their central portions formed with openings, a frame between said plate united thereto about margins of the openings formed through the plates, frames between outer marginal portions of the plates and marginal portions of the inner and outer walls, the frames being continuously united to the plates and the inner and outer walls and together therewith forming a hollow air tight shell having a channel extending entirely about the same, air being exhausted from said shell to form a vacuum therein, and spacer strips in said shell constituting reinforcements for walls thereof.

3. A panel of the character described comprising imperforate walls of sheet material, plates between said walls having their central portions formed with aligned openings, a frame between said plates extending about margins of the openings, frames between outer marginal portions of the plates and the walls and together with the walls and plates and the first frame forming a hollow airtight shell having an external channel extending entirely about the shell, air being exhausted from said shell to form a vacuum therein, and spacers in said shell between the walls and between the walls and said plates constituting reinforcements for the shell.

4. A panel of the character described comprising imperforate walls, plates disposed between said walls and having open central portions, a spacer between inner marginal portions of said plates bordering the open central portions thereof and united to the plates continuously about inner peripheral edges thereof, and spacers between outer marginal portions of the plates and marginal portions of said walls continuously secured thereto throughout their peripheries, said plates and the first frame defining an external channel of appreciable width extending entirely about the panel.

CHARLES J. VAN BUREN.